V. R. BAKER.
LOCK FOR MOTOR VEHICLES.
APPLICATION FILED JUNE 12, 1917.
1,263,731. Patented Apr. 23, 1918.
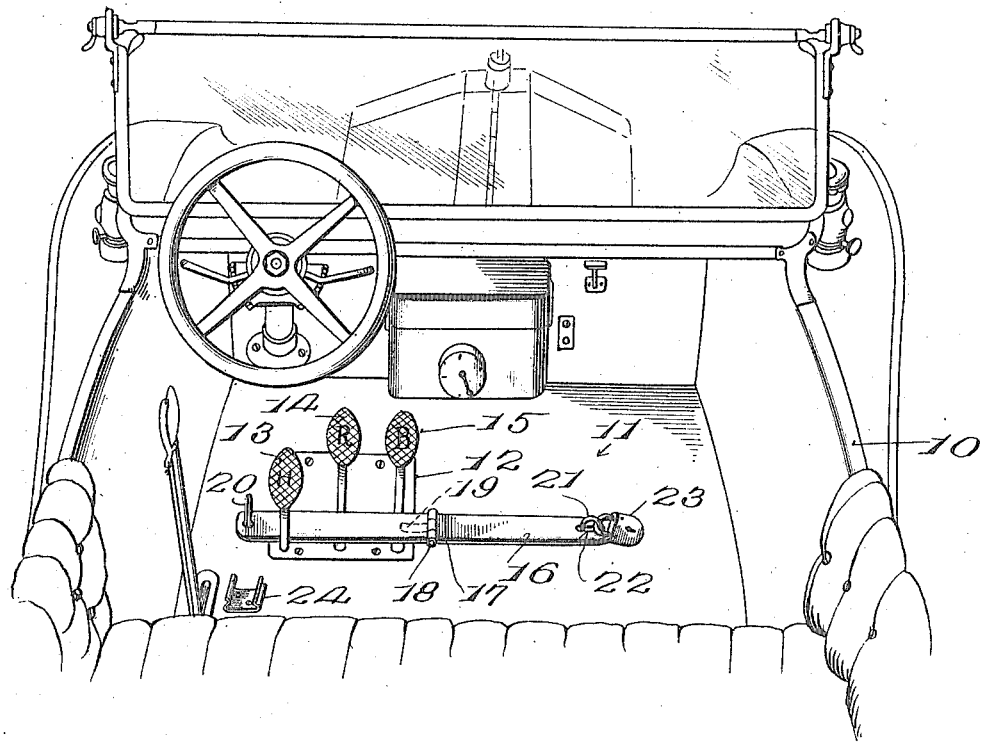
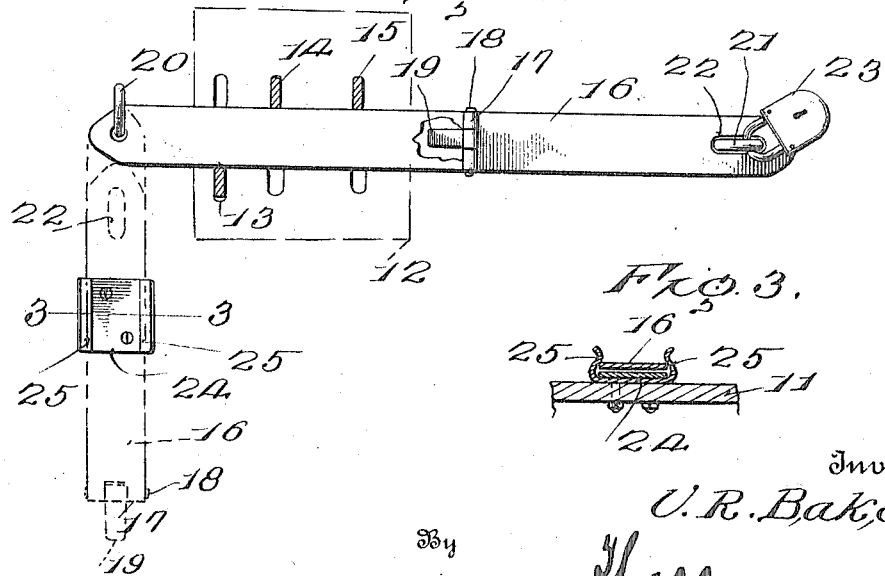
Inventor
V. R. Baker
By
[signature], Attorneys.

UNITED STATES PATENT OFFICE.

VIRGIL R. BAKER, OF ANSONIA, OHIO.

LOCK FOR MOTOR-VEHICLES.

1,263,731.   Specification of Letters Patent.   Patented Apr. 23, 1918.

Application filed June 12, 1917. Serial No. 174,388.

*To all whom it may concern:*

Be it known that I, VIRGIL R. BAKER, a citizen of the United States, residing at Ansonia, in the county of Darke and State of Ohio, have invented certain new and useful Improvements in Locks for Motor-Vehicles, of which the following is a specification.

This invention relates to an improved lock for motor vehicles and more particularly to a device of this character especially designed for use upon automobiles of the type operated by a plurality of foot pedals.

The invention has as its primary object to provide a simple and efficient locking device adapted to be positioned between the operating pedals of the vehicle to render the said pedals inactive and thus lock the vehicle.

The invention has as a further object to provide a locking device which, when in active position between the pedals of the vehicle, will lock the high speed pedal in position with the high speed gearing of the vehicle active, will lock the reverse pedal in position with the reverse gear active and will lock the brake pedal in position with the brake applied to thus positively prevent the operation of the vehicle.

And the invention has as a still further object to provide a locking device which may, when desired, be readily swung to position out of the way and held in such position.

Other and incidental objects will appear as the description proceeds and in the drawings wherein I have illustrated the preferred embodiment of the invention and wherein similar reference characters designate corresponding parts throughout the several views:

Figure 1 is a fragmentary perspective view showing my improved locking device applied to a conventional type of motor vehicle, Fig. 2 is a plan view illustrating the position of the operating pedals of the vehicle when locked by my improved device, this view also showing in dotted lines the arrangement of the locking device when disposed in inactive position, and Fig. 3 is a transverse sectional view taken on the line 3—3 of Fig. 2 and particularly showing the character of clip employed for holding the locking member in inactive position.

In order that the construction, mounting and operation of my improved locking device may be accurately understood I have, in the drawings, shown the device in connection with a conventional motor vehicle 10. Connected to the floor 11 of the vehicle beneath the steering post thereof is a plate 12 and projecting through suitable slots in this plate are the vehicle operating levers. For convenience, the high speed lever has been indicated at 13, the reverse lever at 14 and the brake lever at 15. As is well known, these levers normally stand in a row with the high speed lever in active position and the reverse and brake levers in inactive position.

Coming now more particularly to the subject of the present invention I employ a locking bar or element 16. This bar is preferably formed of coacting sections provided at their inner extremities with mating hinged lugs 17 which receive a pivot pin 18 pivotally connecting the said sections. Projecting from the outermost section of the bar at the joint between the bar sections is a stop lug 19 adapted to engage beneath the innermost bar section for limiting the outermost section of the bar in its swinging movement upon the inner section with the said sections of the bar arranged in alinement. Loosely connecting the locking bar with the floor 11 of the vehicle is a staple or other suitable fastening device 20 arranged at the outer side of the plate 12 of the vehicle and fitting loosely through a suitable opening in the innermost section of the bar. As particularly shown in Fig. 2 of the drawings, the staple 20 is arranged in advance of the normal position of the lever 15 of the vehicle. Projecting from the floor 11 at a point opposite the staple 20 and spaced from the inner edge of the plate 12 is an upstanding staple 21 adapted to be received through a suitable slot 22 in the free extremity of the outermost bar section. Associated with the said staple is a lock 23 which may be of any conventional design. Arranged in the rear of the staple 20, in spaced relation thereto, is a substantially U-shaped clip 24 screwed or otherwise secured to the floor 11. This clip is preferably formed of suitable resilient material and is provided with coacting upstanding yieldable arms 25 slightly directed inwardly toward each other at their free extremities.

In use, the bar 16 is pivoted upon the staple 20 to active position extending between the pedals of the vehicle, as shown in Figs. 1 and 2 of the drawings, and resting upon the floor 11 with the staple 21 received through the slot 22 in the said bar and engaged by the shackle of the lock 23 for locking the bar against displacement. In this connection, it will be observed that when the outer section of the bar is extended, in manipulating the bar, the lug 19 of the said outer bar section will engage the inner section of the bar to prevent the said bar sections from doubling upon each other. In the active position of the bar 16, the said bar is preferably arranged to extend in front of the lever 13 for holding the said lever in normal position with the high speed gearing of the vehicle active and in the rear of the levers 14 and 15 for holding the said levers forwardly with the reverse speed gearing of the vehicle active and with the brake applied. The vehicle will thus be effectually locked and its operation by any unauthorized person prevented. When not in use the sections of the bar 16 are folded upon each other and moved to inactive position engaged, as shown in dotted lines in Fig. 2, within the clip 24 which will thus serve to hold the bar out of the way. In this connection it will be observed, as illustrated in detail in Fig. 3, that the yieldable arms 25 of the said clip are formed to engage over the bar sections for effectually holding the bar against accidental displacement from the clip.

It will therefore be seen that I provide a particularly simple construction for the purposes set forth while at the same time the locking device will prove thoroughly practical in use. Furthermore, the device is of such construction that it may readily be applied to substantially any motor vehicle of the type herein indicated.

Having thus described the invention, what is claimed as new is:

A locking device for motor vehicles including a sectional locking bar swingingly connected to the floor of the vehicle and shiftable to active position with the sections of the bar extended to coöperate with an operating lever of the vehicle, means for locking the bar in the extended position of the sections thereof for locking the vehicle, the bar being shiftable to inactive position away from the said lever of the vehicle and the sections thereof being foldable to lie one upon the other, and a clip arranged to embrace the said bar sections for holding the bar in inactive position and engaging the uppermost bar section for retaining the sections of the bar folded.

In testimony whereof I affix my signature.

VIRGIL R. BAKER. [L. S.]

Copies of this patent may be obtained for five cents each, by addressing the "Commissioner of Patents, Washington, D. C."